(12) United States Patent
Bender et al.

(10) Patent No.: US 11,010,013 B2
(45) Date of Patent: May 18, 2021

(54) PROVIDING VISUAL CONTROL GUIDANCE ON A DISPLAY

(71) Applicant: International Business Machines Corporation, Armonk, NY (US)

(72) Inventors: Michael Bender, Rye Brook, NY (US); John F. Kelley, Polk City, FL (US); Todd P. Seager, Orem, UT (US); Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 16/173,471

(22) Filed: Oct. 29, 2018

(65) Prior Publication Data

US 2020/0133459 A1    Apr. 30, 2020

(51) Int. Cl.
*G06F 3/048* (2013.01)
*G06F 3/0481* (2013.01)
*G06F 9/451* (2018.01)
*G06F 3/0484* (2013.01)

(52) U.S. Cl.
CPC ........ *G06F 3/04812* (2013.01); *G06F 3/0484* (2013.01); *G06F 9/451* (2018.02)

(58) Field of Classification Search
CPC .................................................. G06F 3/04812
See application file for complete search history.

(56) References Cited

U.S. PATENT DOCUMENTS

| | | | |
|---|---|---|---|
| 5,298,890 A | 3/1994 | Kanamaru et al. | |
| 6,493,008 B1* | 12/2002 | Yui | G09G 5/08 348/E5.104 |
| 2006/0033712 A1 | 2/2006 | Baudisch et al. | |
| 2007/0220448 A1* | 9/2007 | Trewin | G06F 3/04812 715/856 |
| 2008/0229254 A1 | 9/2008 | Warner | |
| 2010/0083122 A1 | 4/2010 | Kozloski et al. | |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Claudia Dragoescu
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) of a computing device identifies at least two displays coupled to the processor(s) to render visual objects to a user of the computing device, like a cursor, and processor(s) obtains instructions to render the cursor in various locations on the displays via an input device. The processor(s) obtain a display layout for the displays and resolutions of displays and generates an initial virtual desktop that includes physical real estate of the displays where the processor(s) renders visual objects. The processor(s) determines boundaries of each display and selects outermost two dimensional boundaries of the initial virtual desktops and updates the initial virtual desktop to an area bounded by a virtual rectangle comprising the outermost boundaries, which includes the displays and physical space not useable by the processor(s) to render visual objects.

20 Claims, 7 Drawing Sheets

(56) References Cited

U.S. PATENT DOCUMENTS

| | | | |
|---|---|---|---|
| 2010/0333041 A1* | 12/2010 | Fabrick, II | G06F 3/03545 |
| | | | 715/862 |
| 2011/0246904 A1 | 10/2011 | Pinto et al. | |
| 2012/0146900 A1 | 6/2012 | Ishimoto et al. | |
| 2012/0272179 A1 | 10/2012 | Stafford | |
| 2012/0293439 A1* | 11/2012 | Pahud | G06F 3/04842 |
| | | | 345/173 |
| 2012/0327104 A1 | 12/2012 | Schrauben | |
| 2018/0129510 A1 | 5/2018 | Zhang et al. | |
| 2019/0324704 A1 | 10/2019 | Nam | |

OTHER PUBLICATIONS

List of IBM Patents or Patent Applications Treated as Related, Jun. 30, 2020, 2 pages.

* cited by examiner

100

```
┌─────────────────────────────────────────────────────────────┐
│ PROGRAM CODE EXECUTING ON ONE OR MORE PROCESSORS (WHICH CAN │─110
│ BE EXTERNAL AND/OR INTERNAL TO A COMPUTING DEVICE UPON WHICH│
│ CURSOR MOVEMENTS ARE RENDERED), IDENTIFIES A DISPLAY LAYOUT │
│ OF TWO OR MORE DISPLAYS CONNECTED TO THE COMPUTING DEVICE   │
└─────────────────────────────────────────────────────────────┘
                              │
                              ▼
        ┌───────────────────────────────────────────┐
        │ PROGRAM CODE OBTAINS A RESOLUTION OF EACH │─120
        │ DISPLAY OF THE TWO OR MORE DISPLAYS FROM THE OS │
        └───────────────────────────────────────────┘
                              │
                              ▼
┌─────────────────────────────────────────────────────────────┐
│ PROGRAM CODE GENERATES A VIRTUAL DESKTOP BASED ON THE       │─130
│ DISPLAY LAYOUT AND THE RESOLUTIONS OF EACH DISPLAY, WHEREIN │
│ VIRTUAL SPACE COMPRISING THE VIRTUAL DESKTOP IS DETERMINED  │
│ BY THE PROGRAM CODE RELATIVE TO A PHYSICAL SIZE OF EACH     │
│ DISPLAY OF THE TWO OF MORE DISPLAYS                         │
└─────────────────────────────────────────────────────────────┘
                              │
                              ▼
┌─────────────────────────────────────────────────────────────┐
│ PROGRAM CODE UTILIZES THE OS TO IDENTIFY BOUNDARIES OF EACH │─140
│ DISPLAY OF THE TWO OR MORE DISPLAYS, WHERE THE OUTERMOST    │
│ BOUNDARIES FORM A TWO DIMENSIONAL RECTANGLE                 │
└─────────────────────────────────────────────────────────────┘
                              │
                              ▼
        ┌───────────────────────────────────────────┐
        │ PROGRAM CODE UPDATES THE AREA OF THE VIRTUAL │─150
        │ DESKTOP TO REACH THE OUTERMOST BOUNDARIES │
        └───────────────────────────────────────────┘
                              │
                              ▼
┌─────────────────────────────────────────────────────────────┐
│ PROGRAM CODE MONITORS MOTION OF THE CURSOR, AS CONTROLLED   │─160
│ BY THE INPUT, TOWARD AN EDGE OF A FIRST DISPLAY, WHERE AN AREA │
│ BEYOND THE EDGE REPRESENTS A DISTANCE BETWEEN THE FIRST     │
│ DISPLAY AND A SECOND DISPLAY OF THE TWO OR MORE DISPLAYS,   │
│ WHERE THE PROGRAM CODE CANNOT RENDER AN IMAGE OF THE CURSOR │
└─────────────────────────────────────────────────────────────┘
                              │
                              ▼
┌─────────────────────────────────────────────────────────────┐
│ PROGRAM CODE GENERATES A DIRECTIONAL INDICATOR              │─170
│ COMPRISING A PROJECTION OF A DIRECTION OF MOTION OF THE     │
│ CURSOR BETWEEN THE FIRST DISPLAY AND THE SECOND DISPLAY     │
└─────────────────────────────────────────────────────────────┘
                              │
                              ▼
        ┌───────────────────────────────────────────┐
        │ PROGRAM CODE POSITIONS THE CURSOR ON THE SECOND │─180
        │ DISPLAY, AT A POINT DETERMINED BY THE PROJECTION │
        └───────────────────────────────────────────┘
```

FIG. 1

PROVIDING VISUAL CONTROL GUIDANCE ON A DISPLAY

BACKGROUND

It is commonplace, particularly in professional settings, to utilize multiple monitors with a personal computing device. An impediment to efficiency when utilizing this type of configuration is that unless each monitor or display has the same resolution and all the monitors are perfectly aligned horizontally or vertically, there are gaps. These gaps are recognized by the operating system (OS) executing on the personal computing device, and are in the visual real estate, through which the user navigates a cursor, utilizing a mouse or other input control. In order to navigate through these gaps and maintain a visual of the cursor, users resort to less efficient navigational patterns, such as, in the case of a "T" arrangement of monitors, where two external displays are arrayed horizontally above a laptop display, if a user desires to navigate the cursor from the bottom, laptop display, to the upper-right display, the user moves the mouse (or other control) up the right edge of the laptop display until the cursor is rendered at the "corner" of known virtual desktop space, and then, the user moves right to mouse over into the area that the user had targeted in the upper-right display. This maneuver is inefficient because the user must navigate around virtual walls that are not readily apparent and the moving position of the cursor, during this maneuver, is not readily visible either. The user is therefore unable to move the cursor in a direction in physical space and have this effect mirrored in virtual space.

SUMMARY

Shortcomings of the prior art are overcome and additional advantages are provided through the provision of a method for providing a naturalistic navigation of a cursor. The method includes, for instance: identifying, by one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors; obtaining, by the one or more processors, based on the identifying, a display layout for the identified two or more displays; obtaining, by the one or more processors, based on the identifying, resolutions of the two or more displays; generating, by the one or more processors, based on the resolutions and the display layout, an initial virtual desktop comprising physical real estate of each of the two or more displays, wherein the physical real estate is useable by the one or more processors to render visual objects; determining, by the one or more processors, boundaries of each display of the two or more displays, wherein for each display, physical real estate within the boundaries is useable by the one or more processors to render visual objects on the display; selecting, by the one or more processors, from the boundaries, outermost two dimensional boundaries of the initial virtual desktop, wherein each outermost boundary of the outermost two dimensional boundaries represents a furthest point on the initial virtual desktop in a given direction where the one or more processors render visual objects; and updating, by the one or more processors, the initial virtual desktop to comprise an area bounded by a virtual rectangle comprising the outermost boundaries, wherein the area bounded comprises the physical real estate of each of the two or more displays and physical space not useable by the one or more processors to render visual objects.

Shortcomings of the prior art are overcome and additional advantages are provided through the provision of a computer program product for providing naturalistic navigation of a cursor. The computer program product comprises a storage medium readable by a processing circuit and storing instructions for execution by the processing circuit for performing a method. The method includes, for instance: identifying, by the one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors; obtaining, by the one or more processors, based on the identifying, a display layout for the identified two or more displays; obtaining, by the one or more processors, based on the identifying, resolutions of the two or more displays; generating, by the one or more processors, based on the resolutions and the display layout, an initial virtual desktop comprising physical real estate of each of the two or more displays, wherein the physical real estate is useable by the one or more processors to render visual objects; determining, by the one or more processors, boundaries of each display of the two or more displays, wherein for each display, physical real estate within the boundaries is useable by the one or more processors to render visual objects on the display; selecting, by the one or more processors, from the boundaries, outermost two dimensional boundaries of the initial virtual desktop, wherein each outermost boundary of the outermost two dimensional boundaries represents a furthest point on the initial virtual desktop in a given direction where the one or more processors render visual objects; and updating, by the one or more processors, the initial virtual desktop to comprise an area bounded by a virtual rectangle comprising the outermost boundaries, wherein the area bounded comprises the physical real estate of each of the two or more displays and physical space not useable by the one or more processors to render visual objects.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 is a workflow illustrating certain aspects of an embodiment of the present invention;

DETAILED DESCRIPTION

Figure 2:
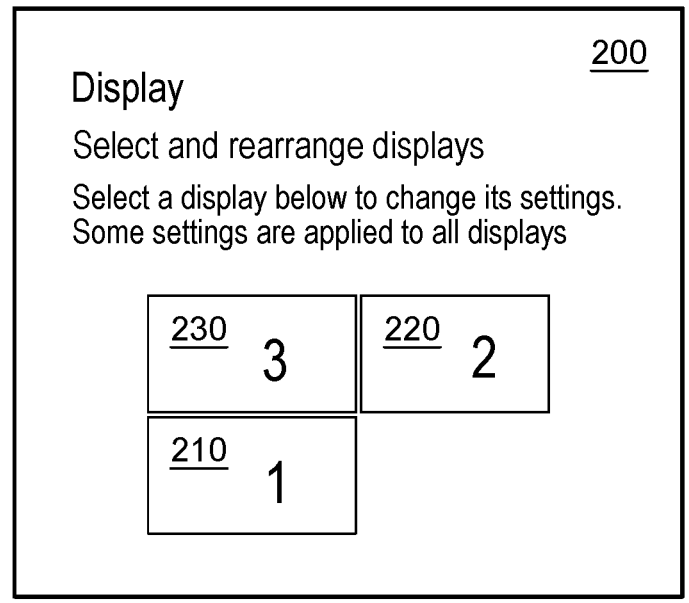
FIG. 2 is an illustration of aspects of a technical environment into which various aspects of an embodiment of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 8:
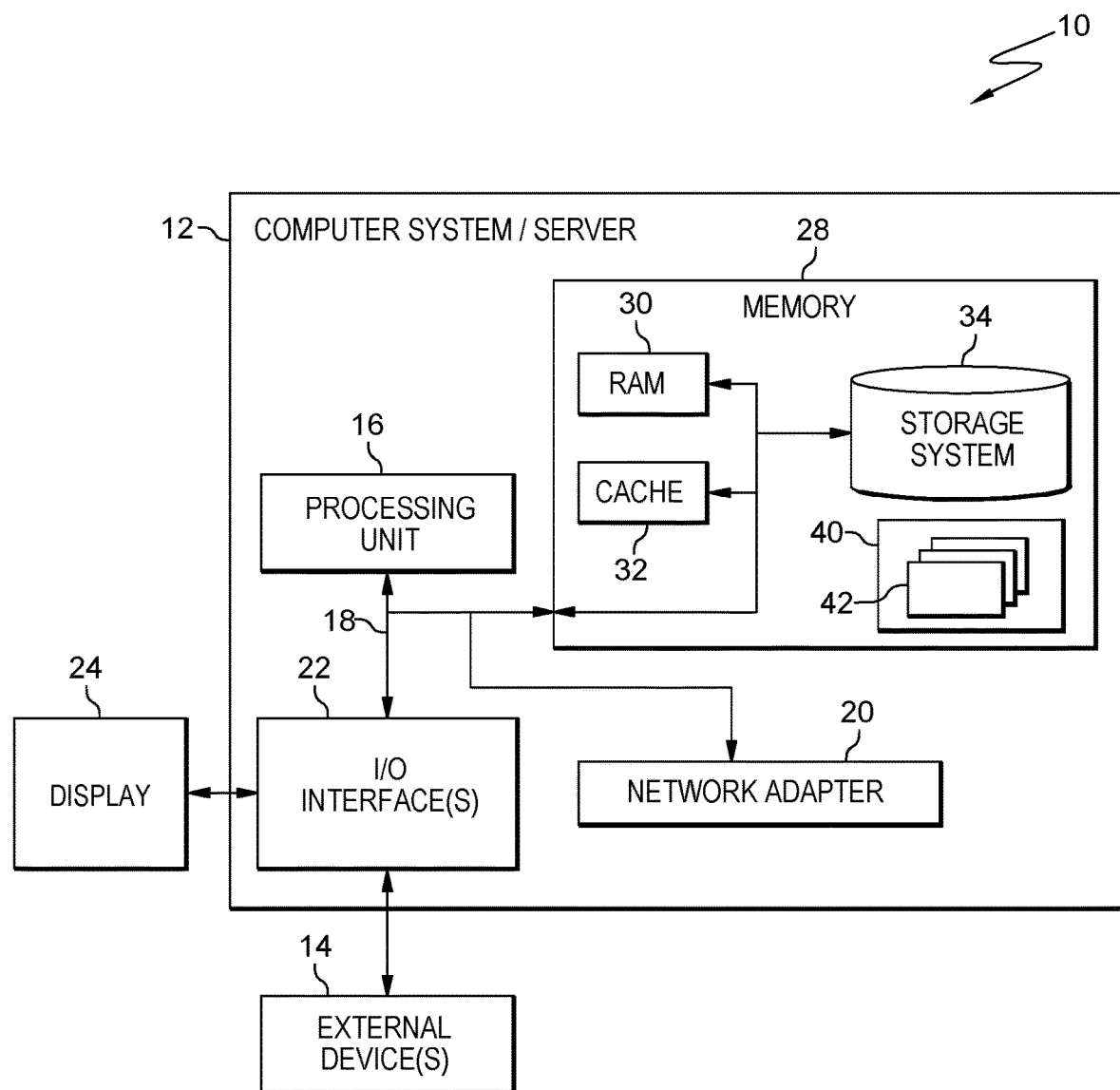
FIG. 8 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 8 as program/utility 40, having a set (at least one) of program modules 42, may be stored in memory 28.

Embodiments of the present invention include a computer-implemented method, a computer program product, and a computing system where program code executing on one or more processors provides visual guidance to a user of a computing device who is navigating a cursor (visual control), utilizing an input device of the computing device (e.g., mouse, keyboard, etc.) from a first display of the computing device with physical boundaries (where the program code cannot display objects beyond the boundaries), to a second display of the computing device with boundaries where the program code cannot display objects beyond the boundaries), where a distance exists between the first display and the second display where the program code cannot display objects. For example, a user may be utilizing a computing device with two or more monitors and may be navigating a cursor between the monitors utilizing a mouse. The physical (three dimensional) space between the monitors is the distance where the program code cannot display objects (as there is no monitor of other surface upon which to render objects). In embodiments of the present invention, in order to enable a user to move the cursor in a direction in physical space that the user wishes to attain in virtual space, program code executing on one or more computing devices (including, but not limited to, the computing device communicatively coupled with the input utilized to navigate a cursor): 1) identifies a display layout of two or more displays connected to a the computing device; 2) queries an OS of the computing device to obtain a resolution of each display of the two or more displays; 3) utilizes the OS to generate a virtual desktop based on the display layout and the resolutions of each display, where virtual space comprising each display is generated relative to the physical size of each display; 4) utilizes the OS to identify outermost boundaries of an area that includes each display of the two or more displays, where the outermost boundaries form a two dimensional rectangle; 5) updates the area of the virtual desktop to reach the outermost boundaries; 6) monitors motion of the cursor, as controlled by the input, toward an edge of a first display, where an area beyond the edge represents a distance between the first display and a second display of the two or more displays, where the one or more processors cannot render an image of the cursor; 7) based on the motion of the cursor, generating a directional indicator comprising a projection of a direction of motion of the cursor between the first display and the second display; and 8) based the cursor crossing the edge, positioning the cursor on the second display, at a point determined by the projection. Thus, the user will see the cursor move from a location on the first display, to a location on the second display, based on a path projected by the program code. Because the virtual space comprising the desktop is generated relative to the physical size of each display, users manipulating a cursor with an input device (e.g., a mouse) will not experience a "jump" in movement when moving the cursor between monitors.

Embodiments of the present invention are inextricably tied to computing and provide significantly more than existing technological approaches to rendering a natural virtual navigation of a cursor through physical spaces between displays or monitors coupled to one or more processors. First, embodiments of the present invention are inextricably linked to computing based on providing a novel approach to a challenge that is unique to computing. Specifically, aspects of the present invention address how to recognize and bridge the gaps between virtual desktop real estate and physical space occupied by multiple displays, in order to make cursor movements more naturalistic. As described herein, the program code in embodiments of the present invention utilizes aspects of an OS of a computing device in order to provide more naturalistic navigation of a cursor when moving across computing displays. Thus, both the technical challenge and the aspects of the present invention that address this challenge are unique to computing and therefore, inextricably linked to computing. Second, aspects of some embodiments of the present invention provide significantly more than existing technological approaches to visually rendering naturalistic cursor navigation between displays or monitors because, as discussed below, aspect of embodiments of the present invention include program code that effectively teaches the OS of a computing device how to recognize and bridge the gaps between virtual desktop real estate and the physical space occupied by multiple displays, in order to make cursor movements more naturalistic and enables a user to traverse a cursor, via a mouse or other input device, among multiple screens that are not contiguously situated in a rectangular workspace. Additionally, embodiments of the present invention provide a significant advantage over existing approaches of moving cursors through multiple monitors because in embodiments of the present invention, the program code determines a display layout of multiple displays along with resolutions of each display of the multiple displays and generates a virtual desktop based on the display layout and the resolutions of each display, by utilizing the OS for cursor movement and positioning on the multiple displays. Utilizing existing aspects of the OS enables the program code to work efficiently within existing computing systems without adversely affecting processing efficiencies. In embodiments of the present invention, program code can navigate a cursor with naturalistic movements over two or more monitors even when the monitors are not uniform in physical size and/or resolution.

FIG. 1 is a workflow 100 that provides an overview of certain aspects of some embodiments of the present invention. In an embodiment of the present invention, program code executing on one or more processors (which can be external and/or internal to a computing device upon which cursor movements are rendered), identifies a display layout of two or more displays connected to the computing device (110). As understood by one of skill in the art, an OS installed on a computing device provides a user with display settings by which a user can manipulate a layout of various displays communicatively coupled to one or more processor of the computing device. A user can utilize a display settings graphical user interface (GUI) or dialog box, to describe a desired layout to the OS and the OS retains the settings. Also retained in the OS are the resolutions of each display. Based on this information, including the physical size of each monitor, the OS generates a virtual desktop space that is inclusive of the physical displays coupled to the one or more processors. For each monitor or display, the program code utilizes the resolution in determining the virtual desktop space and makes this determination, for each monitor, relative to the physical size of each monitor. Certain physical spaces exist between the physical displays, which are effectively walled off from cursor movement.

FIG. 2 is an example of a dialog box 200 through which a user can manipulate display settings in communication with the OS of the computing device. As illustrated in FIG. 2, the OS displays three monitors, a first monitor 210, a second monitor 220, and a third monitor 230, which are communicatively coupled to the one or more processors of the computing device upon which the OS is installed. The user utilizes an input device, such as a mouse, to select the various monitors 210 220 230 and manipulate the settings associated with the monitors 210 220 230, including the resolution of each monitor 210 220 230. Based on the numbers assigned to the monitors, the user has selected a navigational pattern from the first monitor 210, to the second monitor 220, to the third monitor 230. Thus, an area exists between the first monitor 210 and the second monitor 220 where the program code cannot render the cursor.

Figure 3:
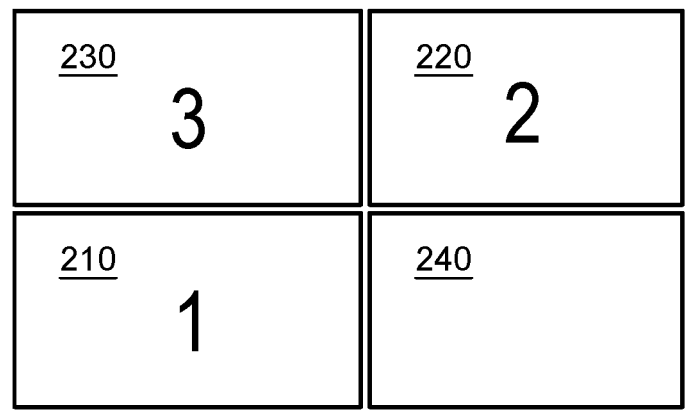
FIG. 3 is an illustration of aspects of a technical environment into which various aspects of an embodiment of the present invention can be implemented.
Figure 4:
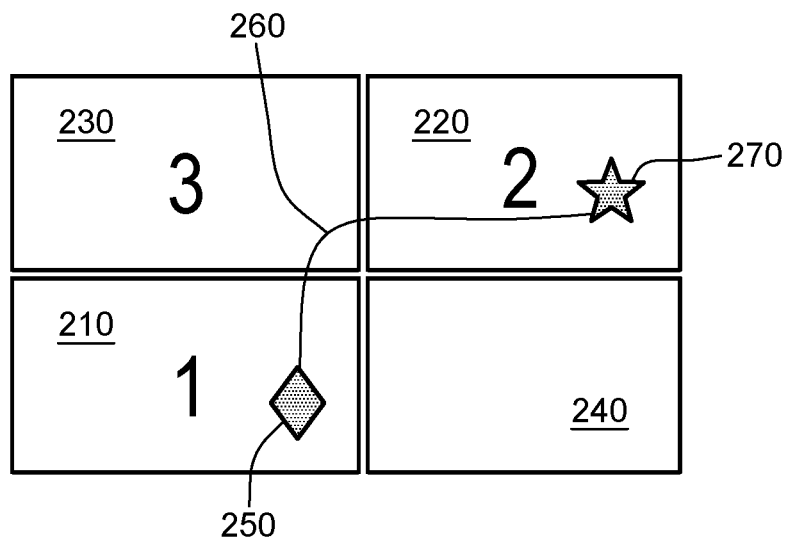
FIG. 4 is an illustration of aspects of a technical environment into which various aspects of an embodiment of the present invention can be implemented.
Figure 5:
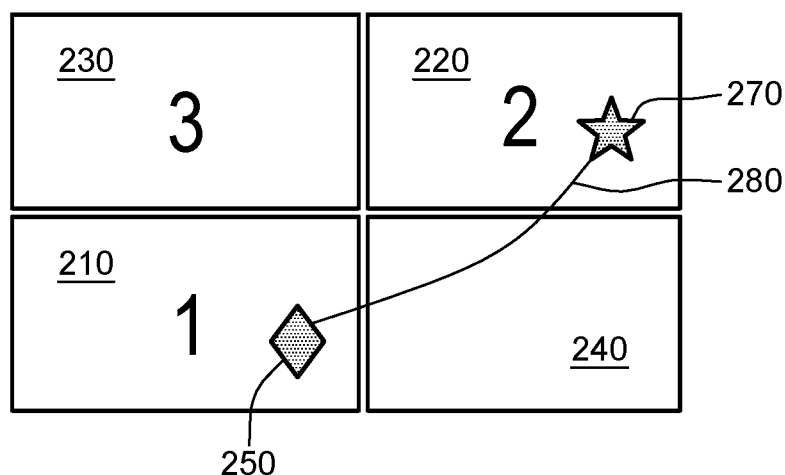
FIG. 5 is an illustration of aspects of a technical environment into which various aspects of an embodiment of the present invention can be implemented.

FIG. 3 shows the location of this area 240, which is effectively walled off from cursor movement. Thus, as illustrated in FIG. 4, in order for a user to navigate from the first monitor 210 to the second monitor 220 and maintain a view of the cursor on the desktop, the user would navigate the mouse around the area 240, thus, starting at a starting point 250, passing on a path 260 through the third monitor 230, to reach a target 270 on the second monitor 220. This route is not the most direct and is inefficient. However, the alternative would be to lose view of the cursor in the area 240, and necessitating "finding" the cursor on the second monitor 220 and navigating it to the target 270. Navigating a cursor through or within the area 240 is not user friendly because a user cannot observe the cursor as it transits this area. FIG. 5 depicts a desired path 280 from the starting point 250 on the first monitor 210, to a target 270, on the second monitor 220. However, the directness of this path 280 is impeded, in existing approaches, by the challenges presented by the area 240.

Returning to FIG. 1, before generating this space, as aforementioned, the OS retains the resolution of each monitor coupled to the computing device upon which the OS executes. Thus, in some embodiments of the present invention, the program code obtains a resolution of each display of the two or more displays from the OS (120). The program code generates a virtual desktop based on the display layout and the resolutions of each display, where virtual space comprising the virtual desktop is determined by the program code relative to a physical size of each display of the two of more displays (130). In embodiments of the present invention, program code facilitates the OS to generate (and/or program code that it part of the OS generates) a rectangular virtual space that includes all the existing available display pixels (on the monitors/displays) as well as any gaps (e.g., area 240, FIGS. 3-5). Thus, the program code utilizes program code utilizes the OS to identify boundaries of each display of the two or more displays, where the outermost boundaries form a two dimensional rectangle, which abut where the program code cannot display the cursor (140). The program code updates the area of the virtual desktop to reach the outermost boundaries (150).

Figure 6:
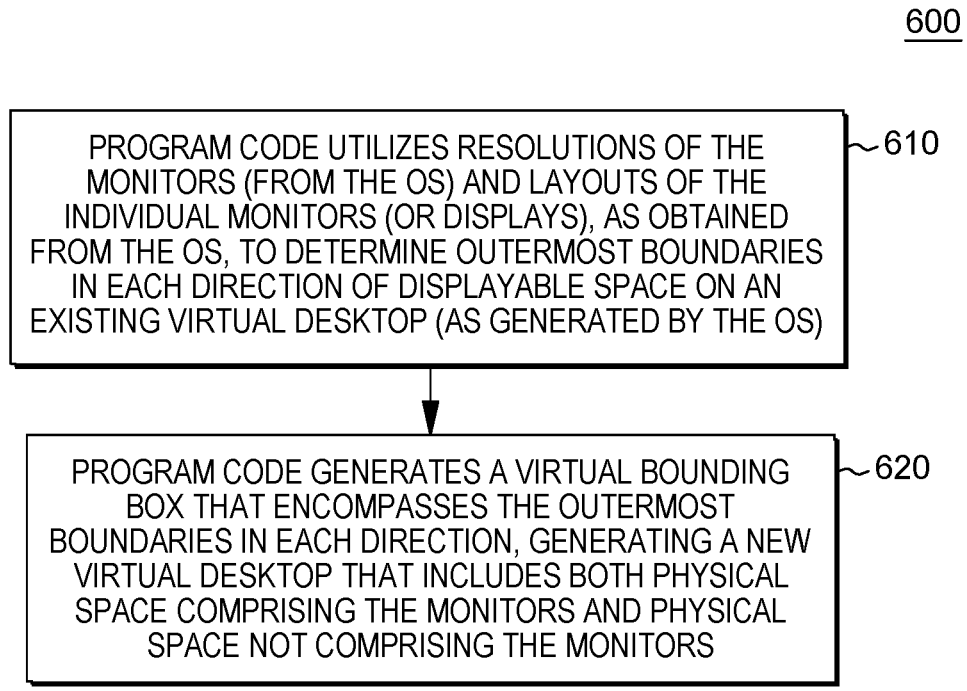
FIG. 6 is a workflow illustrating certain aspects of an embodiment of the present invention.
Figure 7:
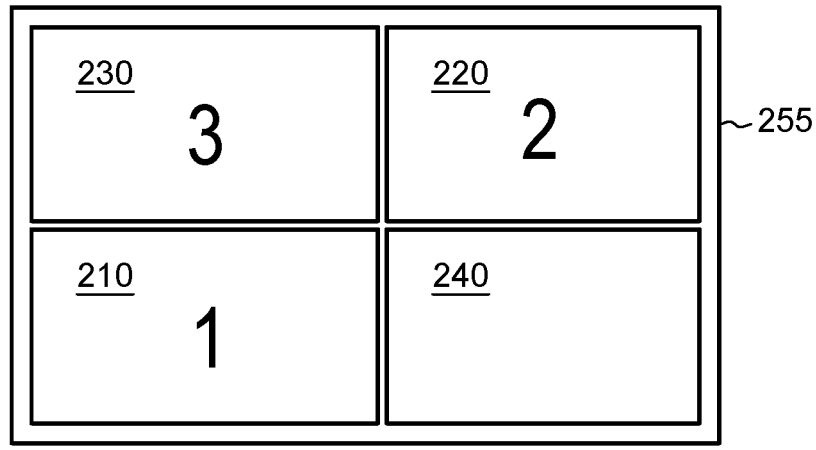
FIG. 7 is an illustration of various aspects of an embodiment of the present invention.

FIG. 6 is a workflow 600 that illustrates, in more detail, the program code generating a virtual desktop based on the display layout and the resolutions of each display (e.g., FIG. 1, 130). In an embodiment of the present invention, the program code utilizes resolutions of the monitors (from the OS) and layouts of the individual monitors (or displays), as obtained from the OS, to determine outermost boundaries in each direction of displayable space on an existing virtual desktop (as generated by the OS) (610). These boundaries include upper left, upper right, lower left, and lower right (most) corners of the existing virtual desktop. The program code generates a virtual bounding box that encompasses the outermost boundaries in each direction, generating a new virtual desktop that includes both physical space comprising the monitors and physical space not comprising the monitors (620). The virtual bounding box can be an object that the program code stores in memory that is not displayed to a user. In some embodiments of the present invention, the virtual bounding box is a two dimensional rectangle. FIG. 7 is an example of bounding box 255 generated by the program code and bounding a new virtual desktop 255 that includes three monitors (displays) 210 220 230 and an area 240 that represents physical space that does not include a monitor.

Returning to FIG. 1, once the program code has determined a rectangular virtual space and identifies boundaries of monitors or displays, the program code allows the user to navigate a cursor from monitor to monitor, through space such as the area 240 (FIGS. 3-5) utilizing a more direct, natural, straight-line motion, to get from one monitor to another. Thus, in some embodiments of the present invention, the program code monitors motion of the cursor, as controlled by the input, toward an edge of a first display, where an area beyond the edge represents a distance between the first display and a second display of the two or more displays, where the program code cannot render an image of the cursor (160). In some embodiments of the present invention, the program code monitors the motion of the cursor, by, at each location of the cursor, mapping two dimensional (e.g., x/y) coordinates of the cursor on the monitor where it is rendered, relative to broader coordinates of the virtual bounding box (e.g., FIG. 7, 255). Program code in embodiments of the present invention can base the x/y coordinate of a cursor on virtual space (and physical space), and recalculate to x/y coordinates of a particular monitor or display, based on its resolution.

The program code generates a directional indicator comprising a projection of a direction of motion of the cursor between the first display and the second display (170). To create the projection, in some embodiments of the present invention, the program code extrapolates and angle of motion, based on monitoring the motion of the cursor. The program code positions the cursor on the second display, at a point determined by the projection (180). For example, when the cursor reaches a screen boundary, the program code infers from a latest direction of motion whether or not an implied straight line of this motion would intersect another screen in the virtual bounding box (e.g., FIG. 7, 255) and, if it does, the program code moves the cursor or hops the cursor to the screen boundary, at that intersection point. Thus, in some embodiments of the present invention, the visual rendered by the program code is of the cursor jumping from a first monitor, to the boundary of the second monitor (e.g., the target screen) at a straight-line point.

In order to illustrate to the user that the cursor is crossing a boundary from a first display to a projected location on the second display, the program code in some embodiments of the present invention can provide additional visual indicators to the user. For example, in some embodiments of the present invention, the program code displays a pulsating marker at a departure point of the cursor on a first screen (e.g., last known point of a screen before a boundary), before entering an area e.g., FIGS. 2-5, 240, FIG. 7, 240) without a display. The program code can also render a pulsating marker at the projected landing point for the cursor, on a second screen (having projected a path through the area without a screen). In some embodiments of the present invention, the markers indicate a direction of current cursor movement and, based on the program code monitoring cursor movement, the program code can change orientation and position of the markers as the cursor's speed and direction change. The program code can pulsate the markers at a more rapid rate, the closer the cursor is to a marker, when in the area (e.g., FIGS. 2-5, 240, FIG. 7, 240) without a display. Thus, the program code can render markers that visually guide a user from a first display, through an area without screens, and help the user orient a landing point on a second (target) display, before the cursor arrives.

Embodiments of the present invention include a computer-implemented method, a computer program product, and a computer system, where program code, executing on one or more processors of a computing device, identifies two or more displays communicatively coupled to the one or more processors, where the two or more displays are utilized by the one or more processors to render visual objects to a user of the computing device, where a cursor is a visual object of the visual objects, where the one or more processors obtain instructions to render the cursor in various locations on the two or more displays via an input device communicatively coupled to the one or more processors. The program code obtains, based on the identifying, a display layout for the identified two or more displays. The program code obtains, based on the identifying, resolutions of the two or more displays. The program code generates, based on the resolutions and the display layout, an initial virtual desktop comprising physical real estate of each of the two or more displays, where the physical real estate is useable by the one or more processors to render visual objects. The program code determines boundaries of each display of the two or more displays, where for each display, physical real estate within the boundaries is useable by the one or more processors to render visual objects on the display. The program code selects from the boundaries, outermost two dimensional boundaries of the initial virtual desktop, where each outermost boundary of the outermost two dimensional boundaries represents a furthest point on the initial virtual desktop in a given direction where the one or more processors render visual objects. The program code updates the initial virtual desktop to include an area bounded by a virtual rectangle comprising the outermost boundaries, where the area bounded includes the physical real estate of each of the two or more displays and physical space not useable by the one or more processors to render visual objects.

In some embodiments of the present invention, the program code tracks the instructions to render the cursor in the various locations on the two or more displays via the input device. The program code determines that executing a series of the instructions to render the cursor includes rendering the cursor as moving through a series of locations on the updated virtual desktop, where the moving orients the cursor progressively closer to an edge of a first display of the two or more displays, where the one or more processors cannot render an image of the cursor in an area proximate to the edge, where the area includes a distance between the edge of the first display and an edge of a second display of the two or more displays, and where a starting point includes a last location on the first display of the series of locations, where the one or more processors can render the cursor. The program code generates a directional indicator comprising a projection of a direction of motion of the cursor from the starting position, through the area, and to the second display, based on the series of instructions. The program code renders the cursor on the second display, at a landing position, based on the projection.

In some embodiments of the present invention, the virtual space comprising the initial virtual desktop is determined by the program code relative to a physical size of each display of the two of more displays.

In some embodiments of the present invention, the program code obtaining the display layout, the resolutions, and the boundaries, includes the program code obtaining the display layout, the resolutions, and the boundaries from an operating system installed on the computing device.

In some embodiments of the present invention, the program code obtaining the display layout, the resolutions, and the boundaries, further includes the program code communicating with the operating system utilizing a communication interface of the operating system.

In some embodiments of the present invention, the program code generates the initial virtual desktop by: facilitating the operating system to generate the initial virtual desktop; and obtaining the initial virtual desktop from the operating system.

In some embodiments of the present invention, the two or more displays include graphical user interfaces.

In some embodiments of the present invention, the input device includes a mouse.

In some embodiments of the present invention, the directional indicator includes a vector commencing at the starting position and terminating at the landing position.

In some embodiments of the present invention, the program code rendering the cursor on the second display at the landing position further includes the program code simultaneously rendering the cursor at the starting position.

In some embodiments at the present invention, the program code tracking the instructions includes the program code determining coordinates for each location on a display, of the two or more displays, specified by an instruction, where the cursor is rendered, relative to the virtual rectangle.

In some embodiments of the present invention, the coordinates include an x coordinate and a y coordinate.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the one or more computing resources executing the program code that performs aspects illustrated in FIGS. 1 and 6 can each be understood as a cloud computing node 10 (FIG. 8) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
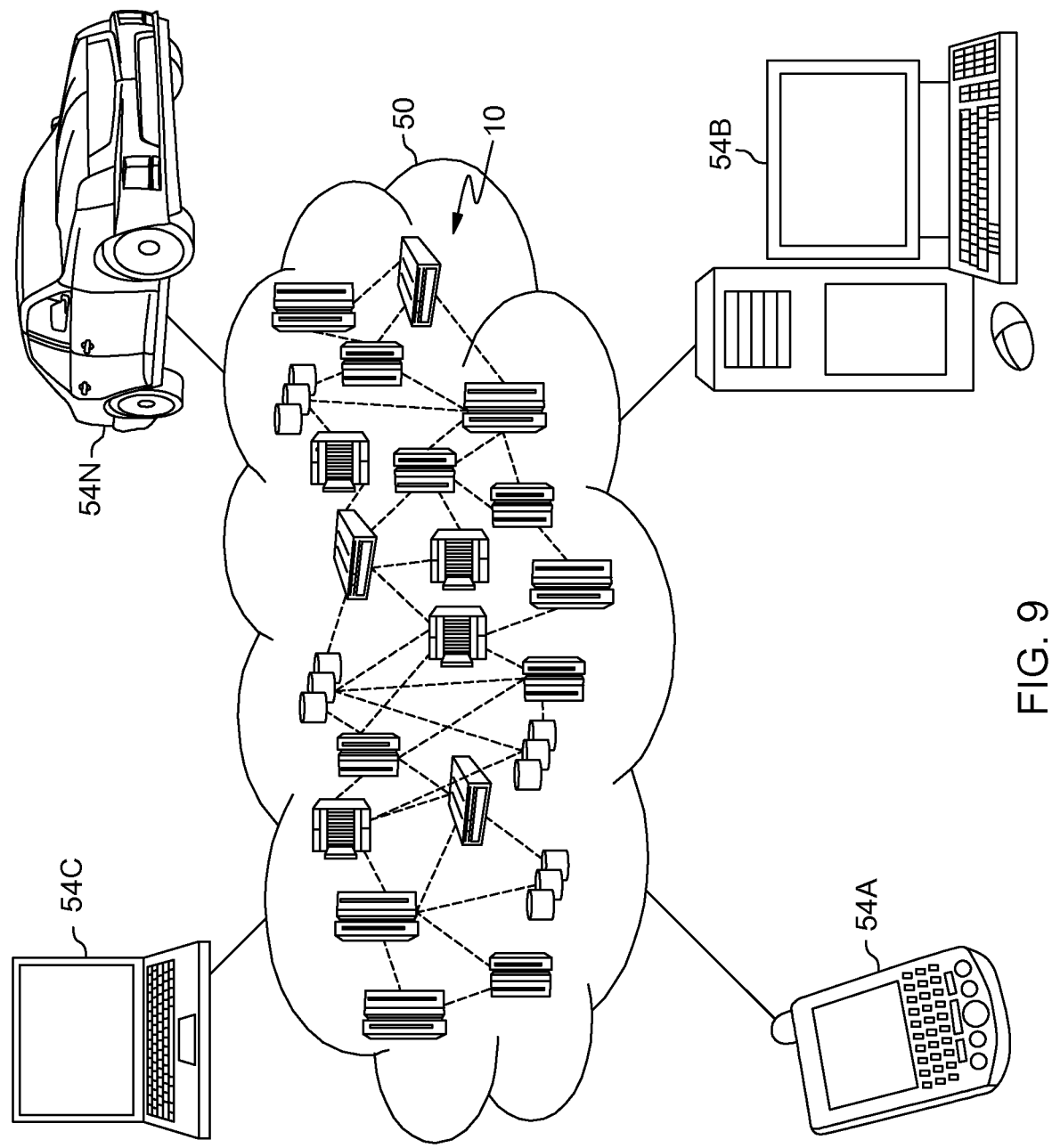
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
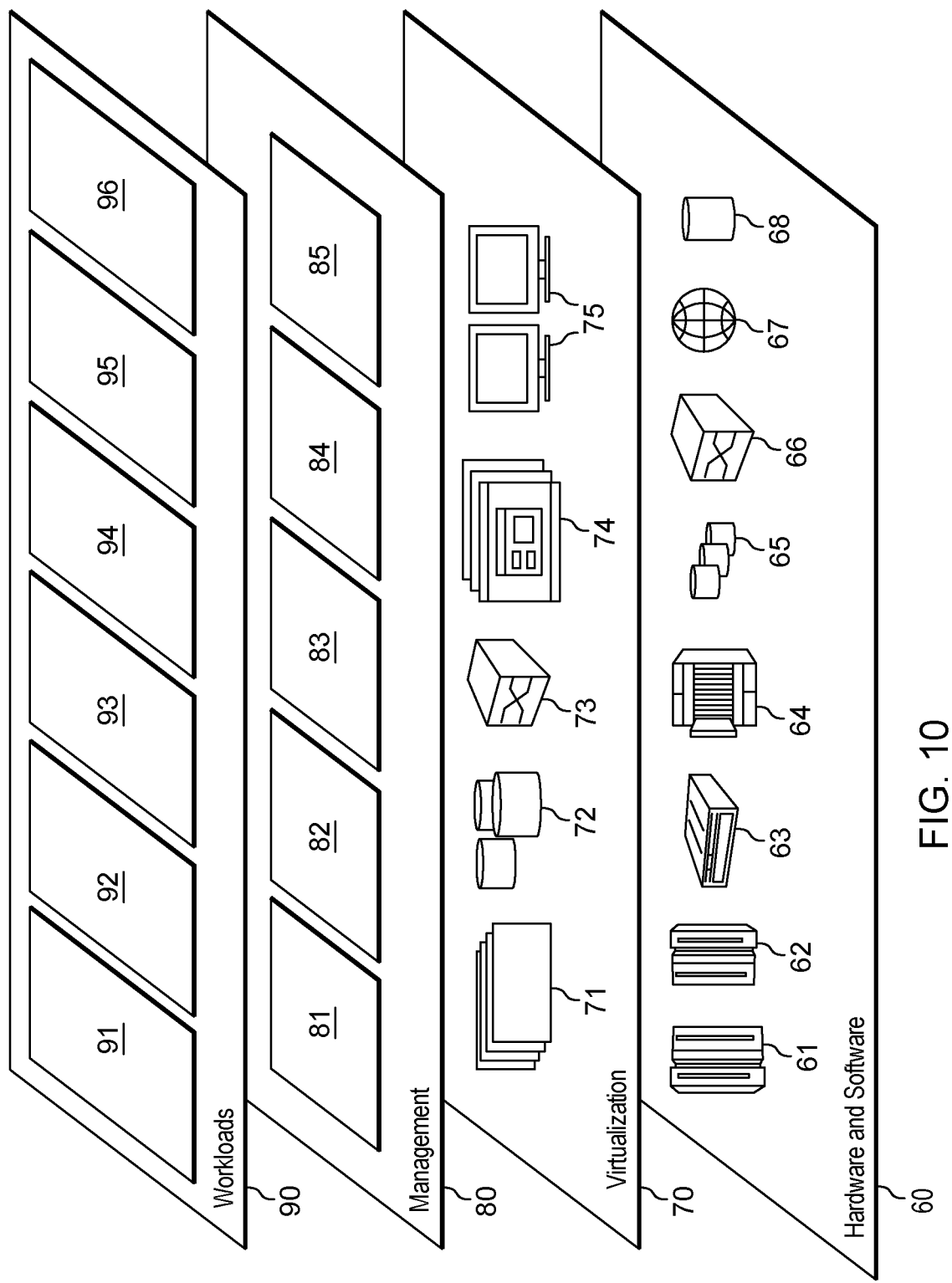
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and naturalistically navigating a cursor across a virtual desktop comprised of two or more displays in any alignment relative to each other 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising
identifying, by one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors;
obtaining, by the one or more processors, based on the identifying, a display layout for the identified two or more displays;
obtaining, by the one or more processors, based on the identifying, resolutions of the two or more displays;
generating, by the one or more processors, based on the resolutions and the display layout, an initial virtual desktop comprising physical real estate of each of the two or more displays, wherein the physical real estate is useable by the one or more processors to render visual objects;
determining, by the one or more processors, boundaries of each display of the two or more displays, wherein for each display, physical real estate within the boundaries is useable by the one or more processors to render visual objects on the display;
selecting, by the one or more processors, from the boundaries, outermost two dimensional boundaries of the initial virtual desktop, wherein each outermost boundary of the outermost two dimensional boundaries represents a furthest point on the initial virtual desktop in a given direction where the one or more processors render visual objects;
updating, by the one or more processors, the initial virtual desktop to comprise an area bounded by a virtual rectangle comprising the outermost boundaries, wherein the area bounded comprises the physical real estate of each of the two or more displays and physical space not useable by the one or more processors to render visual objects, wherein the physical space not useable to render visual objects comprises three dimensional space in which no portion of the two or more displays is present;
tracking, by the one or more processors, the instructions to render the cursor in the various locations on the two or more displays via the input device;
determining, by the one or more processors, that executing a series of the instructions to render the cursor comprises rendering the cursor as moving through a series of locations on the updated virtual desktop, wherein the moving orients the cursor progressively closer to an edge of a first display of the two or more displays, wherein the one or more processors cannot render an image of the cursor in an area proximate to the edge, wherein the area comprises a distance between the edge of the first display and an edge of a second display of the two or more displays, and wherein the area comprises a portion of the three dimensional space in which no portion of the two or more displays is present, and wherein a starting point comprises a last location on the first display of the series of locations, where the one or more processors can render the cursor;
generating, by the one or more processors, a directional indicator comprising a projection of a direction of motion of the cursor from the starting position, through the area, and to the second display, and a projected landing point on the second display, based on the series of instructions;
visually continuously updating, by the one or more processors, on the second display, based on the motion of the cursor from the starting position, through the area, the projected landing point, based on changes during the motion to the direction of the motion the cursor and a speed of the motion of the cursor through the area; and
rendering, by the one or more processors, the cursor on the second display, at the updated landing point, based on a completion of movement of the cursor through the area, and the projection.

2. The computer-implemented method of claim 1, wherein virtual space comprising the initial virtual desktop is determined relative to a physical size of each display of the two of more displays.

3. The computer-implemented method of claim 1, wherein obtaining the display layout, the resolutions, and the boundaries, comprises obtaining the display layout, the resolutions, and the boundaries from an operating system installed on the computing device.

4. The computer-implemented method of claim 1, wherein obtaining the display layout, the resolutions, and the boundaries, further comprises communicating with the operating system utilizing a communication interface of the operating system.

5. The computer-implemented method of claim 4, wherein generating the initial virtual desktop comprises:
facilitating, by the one or more processors, the operating system to generate the initial virtual desktop; and
obtaining, by the one or more processors, the initial virtual desktop from the operating system.

6. The computer-implemented method of claim 1, wherein the two or more displays comprise graphical user interfaces.

7. The computer-implemented method of claim 1, wherein the input device comprises a mouse.

8. The computer-implemented method of claim 1, wherein the directional indicator comprises a vector commencing at the starting position and terminating at a landing position.

9. The computer-implemented method of claim 1, wherein rendering the cursor on the second display at the updated landing point further comprises simultaneously rendering the cursor at the starting position.

10. The computer-implemented method of claim 1, wherein tracking the instructions comprises determining coordinates for each location on a display, of the two or more displays, specified by an instruction, where the cursor is rendered, relative to the virtual rectangle.

11. The computer-implemented method of claim 10, wherein the coordinates comprise an x coordinate and a y coordinate.

12. A computer program product comprising:
a computer readable storage medium readable by one or more processors and storing instructions for execution by the one or more processors for performing a method comprising:
identifying, by the one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors;
obtaining, by the one or more processors, based on the identifying, a display layout for the identified two or more displays;
obtaining, by the one or more processors, based on the identifying, resolutions of the two or more displays;
generating, by the one or more processors, based on the resolutions and the display layout, an initial virtual desktop comprising physical real estate of each of the two or more displays, wherein the physical real estate is useable by the one or more processors to render visual objects;
determining, by the one or more processors, boundaries of each display of the two or more displays, wherein for each display, physical real estate within the boundaries is useable by the one or more processors to render visual objects on the display;
selecting, by the one or more processors, from the boundaries, outermost two dimensional boundaries of the initial virtual desktop, wherein each outermost boundary of the outermost two dimensional boundaries represents a furthest point on the initial virtual desktop in a given direction where the one or more processors render visual objects;
updating, by the one or more processors, the initial virtual desktop to comprise an area bounded by a virtual rectangle comprising the outermost boundaries, wherein the area bounded comprises the physical real estate of each of the two or more displays and physical space not useable by the one or more processors to render visual objects, wherein the physical space not useable to render visual objects comprises three dimensional space in which no portion of the two or more displays is present;
tracking, by the one or more processors, the instructions to render the cursor in the various locations on the two or more displays via the input device;
determining, by the one or more processors, that executing a series of the instructions to render the cursor comprises rendering the cursor as moving through a series of locations on the updated virtual desktop, wherein the moving orients the cursor progressively closer to an edge of a first display of the two or more displays, wherein the one or more processors cannot render an image of the cursor in an area proximate to the edge, wherein the area comprises a distance between the edge of the first display and an edge of a second display of the two or more displays, and wherein the area comprises a portion of the three dimensional space in which no portion of the two or more displays is present, and wherein a starting point comprises a last location on the first display of the series of locations, where the one or more processors can render the cursor;
generating, by the one or more processors, a directional indicator comprising a projection of a direction of motion of the cursor from the starting position, through the area, and to the second display, and a projected landing point on the second display, based on the series of instructions;
visually continuously updating, by the one or more processors, on the second display, based on the motion of the cursor from the starting position, through the area, the projected landing point, based on changes during the motion to the direction of the motion the cursor and a speed of the motion of the cursor through the area; and
rendering, by the one or more processors, the cursor on the second display, at the updated landing point, based on a completion of movement of the cursor through the area, and the projection.

13. The computer program product of claim 12, wherein virtual space comprising the initial virtual desktop is determined relative to a physical size of each display of the two of more displays.

14. The computer program product of claim 12, wherein obtaining the display layout, the resolutions, and the boundaries, comprises obtaining the display layout, the resolutions, and the boundaries from an operating system installed on the computing device.

15. The computer program product of claim 12, wherein obtaining the display layout, the resolutions, and the boundaries, further comprises communicating with the operating system utilizing a communication interface of the operating system.

16. The computer program product of claim 15, wherein generating the initial virtual desktop comprises:
  facilitating, by the one or more processors, the operating system to generate the initial virtual desktop; and
  obtaining, by the one or more processors, the initial virtual desktop from the operating system.

17. The computer program product of claim 12, wherein the two or more displays comprise graphical user interfaces.

18. A system comprising:
  a memory;
  one or more processors in communication with the memory;
  program instructions executable by the one or more processors via the memory to perform a method, the method comprising:
    identifying, by the one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors;
    obtaining, by the one or more processors, based on the identifying, a display layout for the identified two or more displays;
    obtaining, by the one or more processors, based on the identifying, resolutions of the two or more displays;
    generating, by the one or more processors, based on the resolutions and the display layout, an initial virtual desktop comprising physical real estate of each of the two or more displays, wherein the physical real estate is useable by the one or more processors to render visual objects;
    determining, by the one or more processors, boundaries of each display of the two or more displays, wherein for each display, physical real estate within the boundaries is useable by the one or more processors to render visual objects on the display;
    selecting, by the one or more processors, from the boundaries, outermost two dimensional boundaries of the initial virtual desktop, wherein each outermost boundary of the outermost two dimensional boundaries represents a furthest point on the initial virtual desktop in a given direction where the one or more processors render visual objects;
    updating, by the one or more processors, the initial virtual desktop to comprise an area bounded by a virtual rectangle comprising the outermost boundaries, wherein the area bounded comprises the physical real estate of each of the two or more displays and physical space not useable by the one or more processors to render visual objects, wherein the physical space not useable to render visual objects comprises three dimensional space in which no portion of the two or more displays is present;
    tracking, by the one or more processors, the instructions to render the cursor in the various locations on the two or more displays via the input device;
    determining, by the one or more processors, that executing a series of the instructions to render the cursor comprises rendering the cursor as moving through a series of locations on the updated virtual desktop, wherein the moving orients the cursor progressively closer to an edge of a first display of the two or more displays, wherein the one or more processors cannot render an image of the cursor in an area proximate to the edge, wherein the area comprises a distance between the edge of the first display and an edge of a second display of the two or more displays, and wherein the area comprises a portion of the three dimensional space in which no portion of the two or more displays is present, and wherein a starting point comprises a last location on the first display of the series of locations, where the one or more processors can render the cursor;
    generating, by the one or more processors, a directional indicator comprising a projection of a direction of motion of the cursor from the starting position, through the area, and to the second display, and a projected landing point on the second display, based on the series of instructions;
    visually continuously updating, by the one or more processors, on the second display, based on the motion of the cursor from the starting position, through the area, the projected landing point, based on changes during the motion to the direction of the motion the cursor and a speed of the motion of the cursor through the area; and
    rendering, by the one or more processors, the cursor on the second display, at the updated landing point, based on a completion of movement of the cursor through the area, and the projection.

19. The computer-implemented method of claim 1, wherein the visually continuously updating the projected landing point comprises displaying a pulsating visual indicator at the projected landing point on the second display, wherein the pulsating visual indicator pulsates more rapidly as the cursor approaches the projected landing point.

20. The computer-implemented method of claim 1, further comprising:
  rendering, by the one or more processors, the directional indicator and the projected landing point during the motion to guide the motion to the projected landing point.

* * * * *